UNITED STATES PATENT OFFICE.

JOHN T. H. DEMPSTER, OF SCHENECTADY, NEW YORK, ASSIGNOR TO GENERAL ELECTRIC COMPANY, A CORPORATION OF NEW YORK.

METHOD OF WIRE-DRAWING.

1,022,182.

No Drawing.

Specification of Letters Patent.   Patented Apr. 2, 1912.

Application filed January 13, 1911.  Serial No. 602,498.

*To all whom it may concern:*

Be it known that I, JOHN T. H. DEMPSTER, a citizen of the United States, residing at Schenectady, county of Schenectady, State of New York, have invented certain new and useful Improvements in Methods of Wire-Drawing, of which the following is a specification.

My invention relates to the art of wire drawing, and comprises certain improvements whereby the wire is effectively lubricated in its passage through the dies.

My invention, while of general application, is particularly valuable in the hot drawing of metals.

As an instance in which my invention is found of particular value I may mention the drawing of tungsten wire, for use in the manufacture of incandescent electric lamps and for other purposes, in which the wire is drawn through diamond dies while at a temperature in the neighborhood of a red heat, or of incipient redness. The difficulty in securing a suitable lubricant for use under these exacting conditions is very great, and especially in securing a lubricant which will produce a coating on the wire which will more or less permanently adhere and serve to lubricate the wire in its passage through a succession of dies. It has been proposed to use finely divided graphite carried by a vehicle such as water or oil, but the difficulty has been to secure a more or less permanent coating on the wire of a lubricating nature as the dies operate to scrape off the lubricant, so to speak, as the wire enters the die.

I have found that the desired lubricating coating on the wire may be secured by use of a lubricant containing some suitable material such as graphite, and by applying the lubricant in such a manner that it may in a certain sense be said to be burned into or baked on the wire before it passes to the die. What the precise nature of the operation is I will not attempt definitely to state, though it seems probable that the operation is accompanied by an oxidation of the wire whereby the surface thus formed serves to entrap, or cause to be retained, more or less of the graphite, whereby, upon the passage of the wire through the die, the graphite is caused firmly to adhere.

As a lubricating composition I make use of finely divided graphite held in suspension in water or oil, and to this composition certain additions may be made if desired. If a water suspension is employed I may use finely divided graphite stirred up with water, or I may employ a composition well known to the trade as aqua-dag. In case an oil suspension is used I may employ a mixture of finely divided graphite and oil thoroughly stirred together, such for example as that well known to the trade as oil-dag. Where an aqueous suspension is used such as aqua-dag I may add thereto a small quantity, say 10%, of ammonium sulfid which in itself has certain lubricating qualities and which appears to be of advantage, especially in the drawing of tungsten.

In applying the lubricant to the wire previous to its passage through the heated die, the wire is drawn through a cup or other receptacle containing the lubricating material. This material may be of the consistency of thin cream and may conveniently be applied in excess to a body of cotton waste through which the wire may be drawn and which will serve the better to apply the material to the wire.

It is an important feature of my invention that the lubricant shall in a sense be burned into the wire so as to form, after passage through the die, a smooth shiny and adherent lubricating coating. I have found that very good results may be obtained by passing the wire through a gas flame just before it passes into the lubricant and so that it will be heated to redness and will enter the lubricant while thus highly heated. The quenching of the wire as it thus enters the lubricant at a sizzling heat seems to have the effect of baking on a certain amount of the lubricant and rendering it adherent to the wire.

It has been found that under favorable conditions the wire, after having been passed through the die, preceded by the baking on of the lubricant as described, comes out with a shiny, black adherent coating, and that without repetition of this coating operation, it may be passed through a large number of succeeding dies without losing the coating and without causing appreciable wear of the dies. It is to be understood however that the lubricant may be baked on the wire at other or subsequent stages as may be desired, and that this operation may be repeated as often as may be found necessary. In all cases however it is desirable that the shiny coating on the wire be supplemented by passing the wire through a bath of the graphite lubricant preceding its passage through each die.

In some instances the lubricant may be caused to adhere to the wire by passing it through a flame after the wire has emerged from the lubricating bath, but in this case it is important that the length of the heated zone through which the wire passes should not be too great as otherwise the coating, instead of being burned in will be burned off, and the wire will reach the dies in a condition such that the residue may be scraped off by the operation of the die and so the beneficial effects of the lubricant will be lost and the wear on the die greatly increased. I find it preferable, though not essential, therefore, in general, to heat the wire just before it passes into the lubricant. It is also desirable that the dies should be smooth, especially the entrance portions of the dies, so there may be no sharp edges and so that the die surface shall have the effect of compressing and compacting the coating on to the surface of the wire.

What I claim as new and desire to secure by Letters Patent of the United States, is,—

1. The method of drawing wire which consists in baking or burning a suitable lubricant into the surface of the wire by highly heating it when in contact with the wire and then passing the wire through the wire drawing die.

2. The method of wire drawing which consists in baking or burning into the surface of the wire a graphite coating and then passing the wire through the wire-drawing die.

3. The method of drawing tungsten wire which consists in applying to the wire an adherent graphite coating by highly heating graphite while in contact with the wire and then passing the wire through the die.

4. The method of drawing wire which consists in applying to the wire by a baking or burning in operation, a coating which after the passage of the wire through the die is shiny and adherent and then passing the wire through the wire drawing die.

In witness whereof, I have hereunto set my hand this 12th day of January, 1911.

JOHN T. H. DEMPSTER.

Witnesses:
BENJAMIN B. HULL,
HELEN ORFORD.